United States Patent
Lai et al.

(10) Patent No.: US 7,394,617 B2
(45) Date of Patent: Jul. 1, 2008

(54) REMOVABLE DISK PACK HUB AND CLAMP FOR MEDIA SERVOWRITER

(75) Inventors: Kien-Wee Lai, Singapore (SG); Wei-Min Wang, Palo Alto, CA (US)

(73) Assignee: LaserResearch (S) Pte Ltd, Singapore (SG)

( * ) Notice: Subject to any disclaimer, the term of this patent is extended or adjusted under 35 U.S.C. 154(b) by 449 days.

(21) Appl. No.: 11/137,372

(22) Filed: May 26, 2005

(65) Prior Publication Data

US 2005/0264927 A1    Dec. 1, 2005

Related U.S. Application Data

(60) Provisional application No. 60/574,944, filed on May 28, 2004.

(51) Int. Cl.
*G11B 17/08* (2006.01)
(52) U.S. Cl. .................................................. 360/98.08
(58) Field of Classification Search ....................... None
See application file for complete search history.

(56) References Cited

U.S. PATENT DOCUMENTS

| | | | | |
|---|---|---|---|---|
| 5,031,061 A * | 7/1991 | Hatch | ...................... | 360/98.07 |
| 5,331,488 A * | 7/1994 | McAllister et al. | ....... | 360/98.08 |
| 5,644,564 A * | 7/1997 | Peters | ......................... | 720/707 |
| 5,731,927 A * | 3/1998 | Kaneko | ................... | 360/98.08 |
| 6,005,747 A * | 12/1999 | Gilovich | ................... | 360/98.07 |
| 6,704,272 B1 * | 3/2004 | Hagiwara | .................... | 369/269 |
| 6,954,330 B2 * | 10/2005 | Yeom | ....................... | 360/99.12 |
| 2005/0157421 A1 * | 7/2005 | Yeom et al. | .............. | 360/99.12 |

* cited by examiner

*Primary Examiner*—A. J. Heinz
*Assistant Examiner*—Mark Blouin
(74) *Attorney, Agent, or Firm*—Lawrence Y D Ho & Associates Pte. Ltd.

(57) ABSTRACT

The present invention provides a hub/clamp assembly for holding a disk hub in position when the hub is spin in a high speed. The hub/clamp assembly comprises of: a removable disk hub having a shaft for stacking a plurality of storage disks, a flange portion integrally attached to one end of the shaft, and an extension shaft integrally attached to the flange portion opposite to the shaft; wherein the axes of the shaft, the flange portion, and the extension shaft are in alignment; and a hub clamp housing having a housing with side walls and top and bottom surfaces, and a clamp means disposed within the cavity formed within the housing. The present invention also provides a multi-disk servowriter for writing servo information onto multiple storage disks at the same time. The multi-disk servowriter comprises a base with an air spindle shaft providing the spinning power for the servowriter; a removable disk hub having a shaft for stacking a plurality of storage disks, a flange portion integrally attached to one end of the shaft, and an extension shaft integrally attached to the flange portion opposite to the shaft; wherein the axes of the shaft, the flange portion, and the extension shaft are in alignment; and a hub clamp housing having a housing with side walls and top and bottom surfaces, and a clamp means disposed within the cavity formed within the housing.

12 Claims, 3 Drawing Sheets

REMOVABLE DISK PACK HUB AND CLAMP FOR MEDIA SERVOWRITER

RELATED APPLICATION

This application claims the benefit under 35 U.S.C. 119(e) of U.S. Provisional Application Ser. No. 60/574,944, filed May 28, 2004.

FIELD OF THE INVENTION

The present invention relates to multi-disk servo writers, and more particularly, to a removable disk pack hub and clamp assembly employed in a media servowriter.

BACKGROUND OF THE INVENTION

A magnetic storage disk used in the disk drive takes the form of a flat solid substrate with a central opening. The material used for the substrate can be aluminum, glass, ceramic, plastic, or other composite material depending on the application involved. A thin layer of magnetic material is coated on both surfaces of the substrate, followed by a protective layer.

For data reading from or writing onto the magnetic layer of a magnetic storage disk, a transducer read-write head is positioned over each disk surface. This transducer read-write head is usually supported by an overhanging actuator arm and mounted onto an aerodynamically shaped block that glides at an extremely small distance from the disk surface when the disk is spinning. This extremely small distance to the disk surface is required for the transducer read-write head to read or write data patterns into the magnetic layer of the disk. The actuator arm carrying the read-write head is pivoted about an axis so that the read-write head can be swung in and out of the disk surface as desired.

Storage data are laid down along circular tracks around the disk surface. To enable the read-write head to know where it is positioned, servo data is pre-recorded along circular tracks on the disk. These servo data contain information that is readable by the read-write head and subsequently is interpreted by the servo system firmware to determine which track the head is on, and to keep the head on the desired track.

Writing down the tracks of servo data onto the disk surface is an essential step in the manufacturing of a disk drive. Servo track writing is normally carried out in the manufacturing plant. As the servo tracks serve as the positional and timing references for a read-write head, precise positioning and timing is required when the servo track is laid down on the disk surface.

One scheme for writing the servo data is to carry out the writing process after magnetic disks have been placed inside the enclosure of a disk drive. Part of the drive enclosure is temporary left open to expose the actuator arm carrying the read-write head. Additional fixture with precision positioning feedback is then used to guide the movement of the actuator arm over the disk surface. This additional fixture can take the form of an external actuator arm. In one variation, the external actuator arm is made to physically push the drive actuator arm along. In another variation, an edge sensor is used ensure that the drive actuator arm will move in synchronous with the external actual arm.

In the self-servo writing scheme, the disks are partially servo-written in the disk drive using one of the above-mentioned schemes in the cleanroom. The rest of the servo tracks are then filled in after the disk drives are taken outside the cleanroom. The intention is to optimize the usage of the cleanroom space.

The additional fixture can also take the form of a small sheet scale embedded in the drive actuator arm. Using an external reader, the position of the drive actuator arm can be read from the scale and controlled directly. By using the embedded scale for positioning, no external actuator is required. The drive actuator still maintains its lightweight and the system is less affected by external excitation such as air turbulence and vibrations. The system is also more tolerant of the vertical vibration of the actuator arms. This method of positioning the drive actuator arm does not require a temporary opening in the drive enclosure. The servo track writing can therefore be carried out outside the cleanroom. The only drawback is perhaps the increase in manufacturing cost by having a sheet scale to be included in every disk drive.

Other schemes have been devised to enable the servo writing process to be written outside the cleanroom. One method is to use an optical clock head for servo writing. The optical clock head reads a timing sheet scale attached to the rotation disk or spindle by optical means through a transparent window. Using such a transparent window in the controlling of the drive actuator arm, the disks in the disk drives may be servo written outside the cleanroom.

In another servo-writing scheme, the process is carried out before the disks are placed inside the drive enclosure. The disks are servo-written on dedicated equipment, commonly called media servowriter, in the cleanroom. One advantage of this scheme is that multiple disks can be servo-written at any one time using the same set of hardware. As disk drives nowadays usually only contain one to two disks, in-drive servo-writing schemes described in the previous paragraphs can take up a lot of cleanroom space and time. By servo-writing multiple disks outside the drive, usage of cleanroom space and time can be substantially reduced. Using better performance components, equipment dedicated for servo-writing is capable of writing servo-tracks with higher quality. This becomes especially important as the track density of the disk media increases.

On a media servowriter, the disks are stacked and packed in a hub that is attached to the spinning shaft of an air-bearing spindle motor. During servo-track writing, the rotary motion of the spindle shaft spins the hub with its disk pack. In order to ensure that the hub is tightly and centrally held down to the rotating spindle shaft when the servo track is being written, one approach is to use a clamp that only exerts a radially inward force to hold the hub. The evenly distributed force pushed the hub towards the center of the spindle shaft while at the same time hold the hub tight for rotation. This is to ensure hub is clamped tightly during spinning. Hub and hub clamp are machined with precision and well balance, when spindle rotates at high speed the mechanical vibration is minimal. This will ensure read-write on the disk can be performed smoothly. The quality of the servo tracks written will also be compromised.

Furthermore, the disk hub should be designed such that it can be easily detached from the spindle shaft after the servo-writing process, while the hub clamp responsible for holding the hub to the spindle shaft should be so designed that it allows the disk hub to be easily removed. A removable disk hub allows the disks to be stacked and un-stacked outside the media servowriter equipment, enabling more efficient time usage of the media servowriter.

SUMMARY OF THE INVENTION

Therefore, one objective of the present invention is to provide a multi-disk servowriter that improves the efficiency and quality of servo information writing onto storage disks. The improvement is achieved by having a disk hub clamping mechanism that not only hold a disk hub tightly and accurately to a spinning spindle shaft but also enable the disk hub to be easily removed upon completion of the servo information writing process. Another object of the present invention is to provide a disk hub clamping mechanism that uses only a few parts that can be easily fabricated and assembled. Yet another object of the present invention is to provide a disk hub clamping mechanism that will not load the spindle motor excessively.

In one aspect of the present invention, there is provided a hub/clamp assembly for holding a disk hub in position when the hub is spin in a high speed. The hub/clamp assembly comprises of: a removable disk hub having a shaft for stacking a plurality of storage disks, a flange portion integrally attached to one end of the shaft, and an extension shaft integrally attached to the flange portion opposite to the shaft; wherein the axes of the shaft, the flange portion, and the extension shaft are in alignment; and a hub clamp housing having a housing with side walls and top and bottom surfaces, and a clamp means disposed within the cavity formed within the housing; wherein the top surface of the housing has a central opening through which the extension shaft of the removable disk hub can pass through; and wherein, when the extension shaft of the removable disk hub is positioned within the cavity formed by the side walls of the housing, the clamp means can hold the extension shaft tightly, thereby the removable disk hub can be held in position when the hub is spin in a high speed. In one embodiment, each of the plurality of storage disks has a central opening; and wherein the shaft has a cylindrical shape and is so configured that it has a uniform diameter slightly smaller than the diameter of the central opening of the storage disks; thereby the storage disks can be stacked onto the shaft tightly without additional means. In another embodiment, the flange portion has a circular shape with a first and a second planar surfaces that are flat and accurately machined; and wherein the first planar surface provides contact with one storage disk, and the second planar surface provides fit contact with the top surface of the hub clamp housing. In yet another embodiment, the extension shaft is so configured that it has a smooth protrusion with a largest diameter snugly fitting the opening on the top surface of the hub clamp housing, ensuring the removable disk hub being centered on the hub clamp housing; and a ball-shaped end allowing the clamping means to engage on and hold the removable disk hub tightly on the top surface of the hub clamp housing.

In one embodiment, the clamp means comprises a catch plate with a plurality of circumferentially spaced slabs extending from the side walls of the housing towards the center of the hub clamp housing, and a plurality of specially shaped inserts integrally disposed onto the smaller end of each of the plurality of circumferentially spaced slabs; thereby, when the inserts engage the ball-shaped end of the extension shaft, the slabs press the ball-shaped end downwards and towards the center of the shaft axis; and when the slabs are bended, the inserts will disengage the ball-shaped end, releasing the removable disk hub from the clamping means so that the removable disk hub can be removed from the hub clamp housing. In another embodiment, the clamp means further comprises a quick release mechanism that will push and bend the slabs of the catch plate upwards and disengage the inserts from the ball-shaped end of the extension shaft. In yet another embodiment, the quick release mechanism comprises a plurality of pushpins lined in circles mounted on a plate placed under the slabs; thereby, when the plurality of pushpins are pushed upwards, the slabs will be pushed upwards, resulting disengagement of the inserts with the ball-shaped end. In still another embodiment, the plurality of pushpins are pushed against the slabs by compressed air.

In another aspect of the present invention, there is provided a multi-disk servowriter for writing servo information onto multiple storage disks at the same time. The multi-disk servowriter comprises a base with an air spindle shaft providing the spinning power for the servowriter; a removable disk hub having a shaft for stacking a plurality of storage disks, a flange portion integrally attached to one end of the shaft, and an extension shaft integrally attached to the flange portion opposite to the shaft; wherein the axes of the shaft, the flange portion, and the extension shaft are in alignment; and a hub clamp housing having a housing with side walls and top and bottom surfaces, and a clamp means disposed within the cavity formed within the housing; wherein the top surface of the housing has a central opening through which the extension shaft of the removable disk hub can pass through; and wherein, when the extension shaft of the removable disk hub is positioned within the cavity formed by the side walls of the housing, the clamp means can hold the extension shaft tightly, thereby the removable disk hub can be held in position when the hub is spin in a high speed; and wherein the hub clamp housing is rigidly mounted onto the air spindle shaft so that the removable disk hub and the hub clamp housing spins with the air spindle shaft.

The objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

The present invention may be understood more readily by reference to the following detailed description of certain embodiments of the invention. However, it will be understood by those skilled in the relevant art that the present invention may be practiced without these specific details. In other instances, well-known methods, procedures, and components have not been described in detail so as not to obscure the present invention.

Throughout this application, where publications are referenced, the disclosures of these publications are hereby incorporated by reference, in their entireties, into this application in order to more fully describe the state of art to which this invention pertains.

Figure 1:
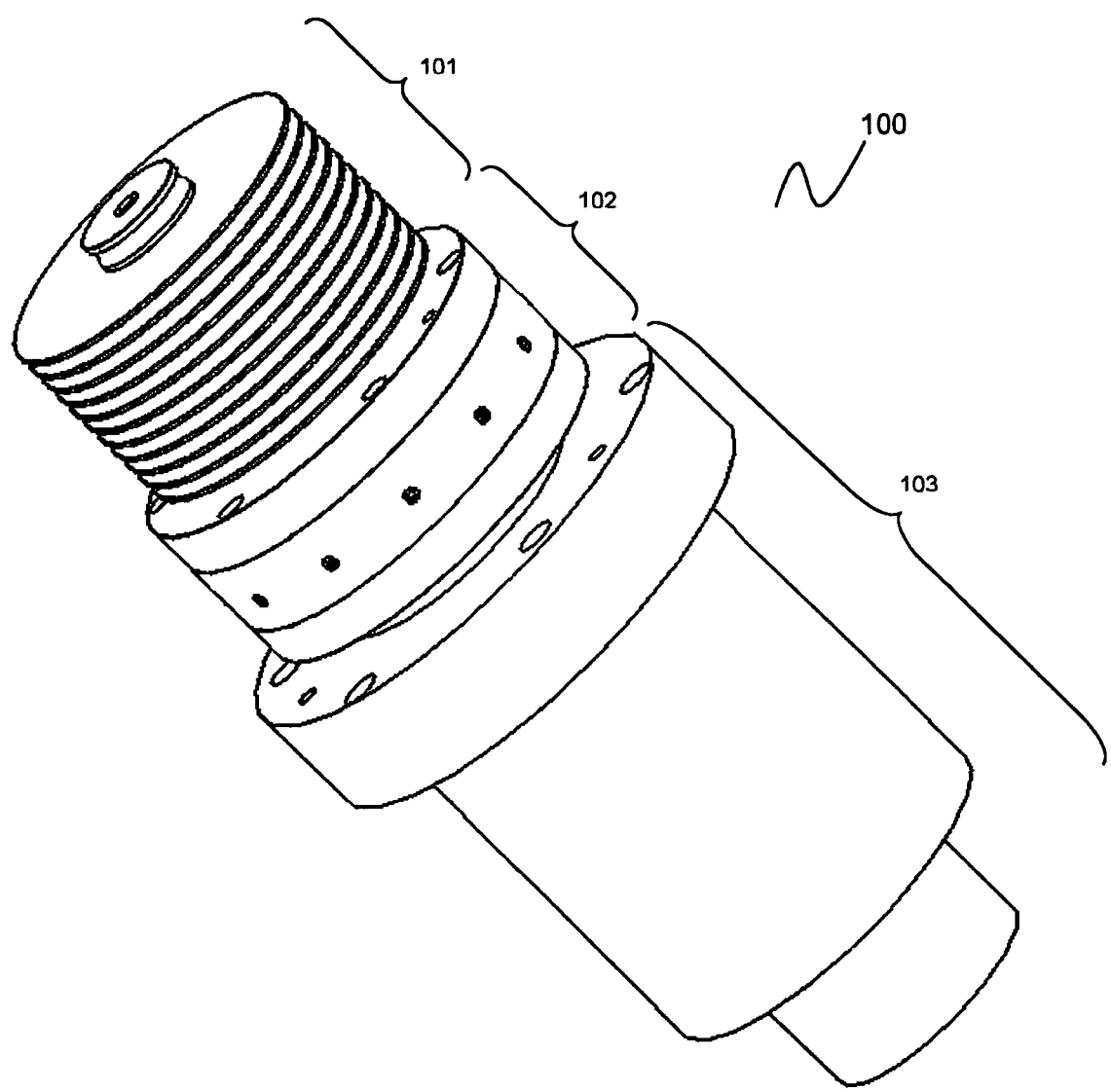
FIG. 1 shows an isometric view of the hub/clamp/spindle assembly employed in a multimedia servowriter in accordance with one embodiment of the present invention.

Referring to FIG. 1, there is provided a hub/clamp/spindle assembly in accordance with one embodiment of the present invention. It is to be appreciated that while one application of the assembly will be used in a multimedia servowriter, it may be employed in other apparatuses or applications such as hard disk drive. More importantly, the hub/clamp locking configuration may be utilized in any suitable applications without limiting to multimedia servowriter.

As shown in FIG. 1, the hub/clamp/spindle assembly 100 comprises a removable disk hub 101, a hub clamp housing 102, and an air spindle 103 mounted on a base of a servowriter (not shown). Usually, the removable disk hub is mounted onto the hub clamp housing that in turn is bolted to the air spindle. The air spindle may be any type available in the art so long that it is suitable for the specified application.

Figure 2:
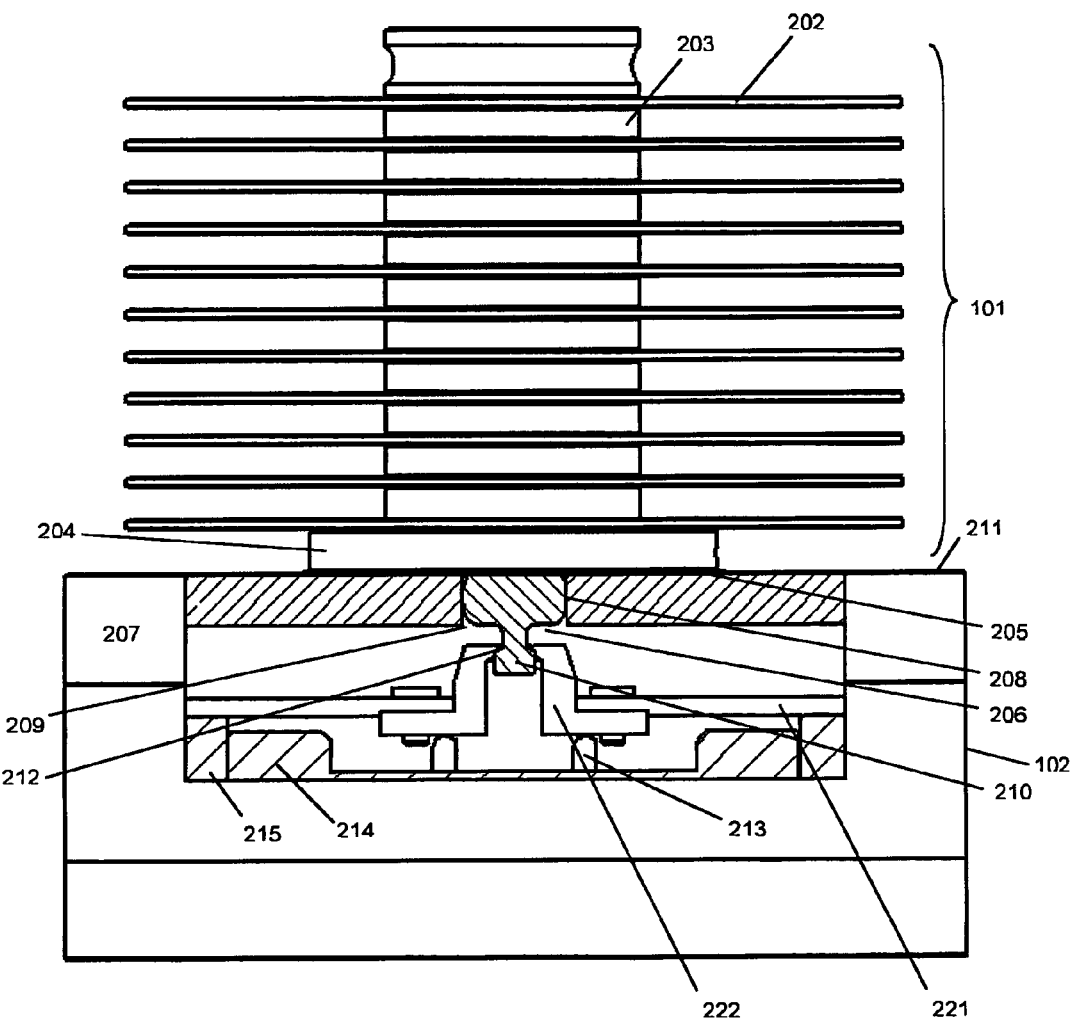
FIG. 2 shows a schematic cross-section view of the hub/clamp assembly in its locked position in accordance with one embodiment of the present invention.

Now referring to FIG. 2, there is provided one configuration of the removable disk hub 101 and the hub clamp housing 102 in accordance with one embodiment of the present invention. FIG. 2 shows a schematic cross-section view of the hub/clamp assembly in its locked position. The removable disk hub 101 comprises a shaft 203, a circular flange portion 204, and an extension shaft 206. The shaft 203 carries a plurality of magnetic disks 202 that are rigidly tightened to it. The shaft 203 is precisely machined with a diameter slightly smaller than the diameter of the central apertures on the disks. The circular flange portion 204 is at the base of the shaft. It is to be appreciated that the orientation used in this application is for the sole purpose of convenience of description. The circular flange portion 204 is accurately machined with a uniform diameter and thickness and has a flat and accurately machined bottom surface 205 that is perpendicular to the axis of the shaft 203. The shaft axis is accurately located at the center of the circular flange portion 204. The flange may take non-circular shape. For any non-circular shape design, one has to ensure that when the hub is spinning at high speed, there are no un-balanced forces causing the hub to vibrate. The circular flange portion 204 attach to the shaft 203 is machined as one piece. Alternatively, the circular flange portion 204 may be separately machined and assembled with the shaft 203.

The extension shaft 206 is at the bottom side of the circular flange portion 204, opposite to the shaft 203. The extension shaft 206 enables the disk hub 101 to sit on the hub clamp housing 102 that is mounted tightly to the rotating shaft of the air spindle 103. The axis of the extension shaft 206 is accurately in alignment with the ones of the shaft 203 and the circular flange portion 204. The extension shaft 206 is so configured as to have two portions: a smooth protrusion with a largest diameter 208, and a ball-shaped end 210, where the two portions form an integral piece. In certain embodiments, the ball-shaped end is machined as one piece together with the shaft 203 to form the extension shaft. In certain embodiments, the ball-shaped end may be machined separately and then assembled with the smooth protrusion to form the extension shaft. The smooth protrusion with a largest diameter 208 is right at the bottom base of the circular flange portion 204, and may snugly fit the opening 209 on the top surface of the hub clamp housing 102. This fitting ensures that the disk hub 101 is centered on the hub clamp housing 102. In addition, the smooth protrusion with a largest diameter 208 can also function as a guide for the disk hub when it passes through the opening 209. The dimensions and position of the top opening 209 on the hub clamp housing are machined with high precision. This opening 209 guides and centers the position of the hub when the hub sits on the hub clamp housing. The ball shaped end 210 allows the hub clamp housing 102 to tightly hold the disk hub 101, described in details hereinafter.

Still referring to FIG. 2, the hub clamp housing 102 comprises a housing 207, a catch plate 220 disposed within the cavity formed within the housing 207, and the opening 209 on the top surface of the hub clamp housing 102 described earlier.

Figure 3:
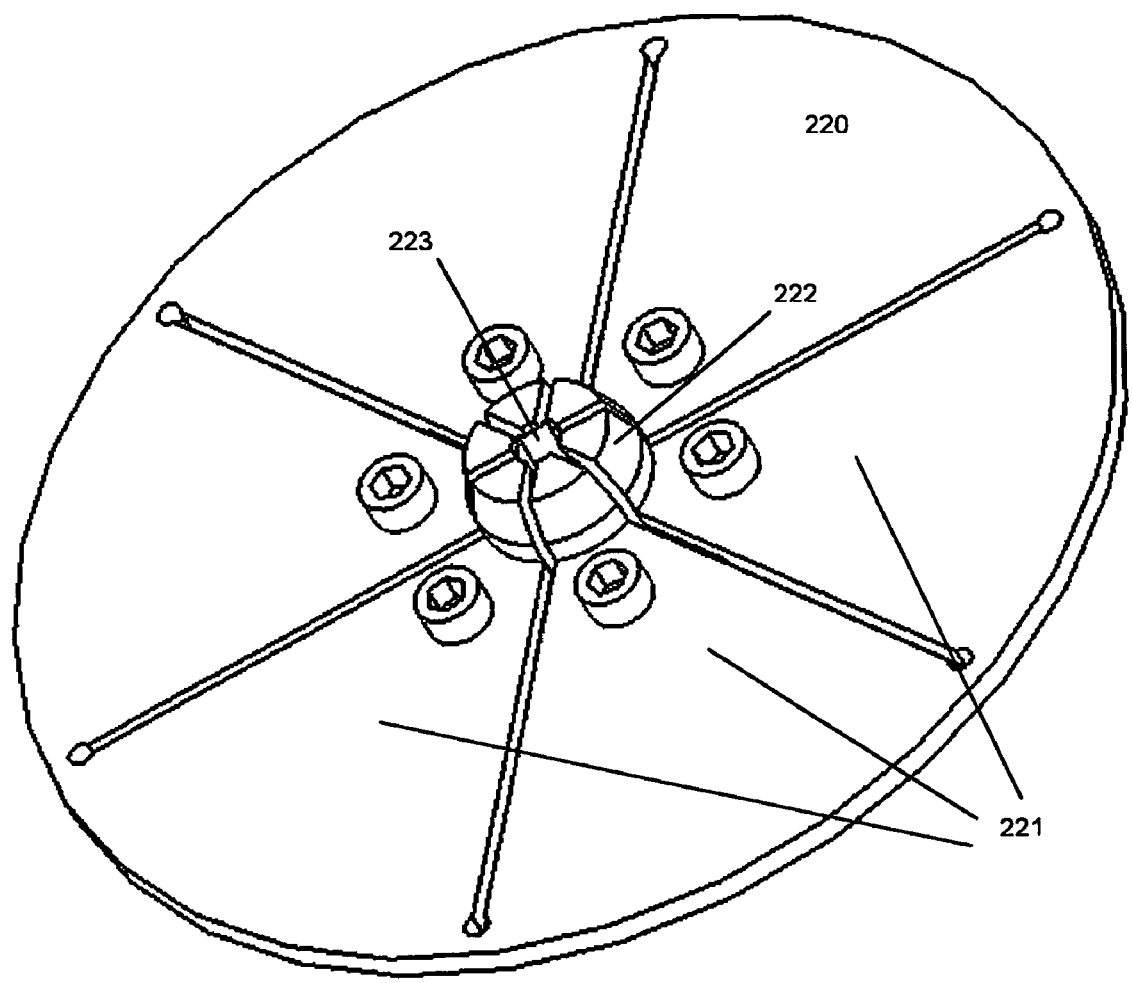
FIG. 3 shows an enlarged isometric view of the catch plate and inserts used in the clamp mechanism in accordance with one embodiment of the present invention.

Referring now to FIG. 3, the catch plate 220 comprises a plurality of circumferentially spaced slabs 221, and inserts 222 connected to the smaller end of each of the plurality of the slabs. The inserts 222 form an adjustable central opening 223 that either holds the ball-shaped end 210 tightly when the slabs and inserts are in a close configuration, or releases the ball-shaped end 210 and thus the disk hub when the slabs and inserts are in an open configuration.

Now referring back to FIG. 2, there is provided a configuration of the engagement of the catch plate 220 with the ball-shaped end 210, holding the disk hub tightly to the top surface 211 of the hub clamp housing 102. The plurality of circumferentially spaced slabs 221 extend from the sidewall 215 of the housing towards the center of the plate, and the specially shaped inserts 222 engage the ball-shaped end 210 of the disk hub extension shaft. The catch plate 220 is held in position in the hub clamp housing 102 around its rim. When the disk hub is not mounted on the hub clamp housing, the slabs and the inserts at their tips are all lined up flat with the adjustable central opening 223 at the center of the catch plate. The diameter of the opening 223 is smaller than that of the ball-shaped end of the hub shaft extension. In one embodiment, by applying sufficient upwards transverse forces to the slabs, the slabs, acting as cantilever arms, can bend elastically upwards, lifting the inserts at the tips up at the same time. This opens out the central opening of the catch plate. When sufficient forces are applied, the diameter of the central opening can be made larger than the ball-shaped end.

To insert the disk hub into the hub clamp, the slabs of the catch plate are pushed upwards causing the central opening of the catch plate to increase until its diameter is larger than the diameter of the ball-shaped end of the extension shaft. After the disk hub ball-shaped end is inserted right into the central opening of the catch plate, the upwards pushing forces on the slab are removed. The inserts at the tips of the slabs will, at this moment, be pressing onto the ball-shaped end in a circle around it. The inserts are shaped such that they will press onto the upper region 212 of the ball shaped end. By design, the contact forces on the ball-shaped end press the ball shaped end of the extension shaft downward and towards the center of the shaft axis at the same time. This ensures that the hub will be both centrally positioned and held in uniform close contact with the top surface of the hub housing. The catch plate thus holds the said disk hub tightly against the top surface of the housing. In the preferred embodiment, when the disk hub sits on the hub clamp housing, the ball shaped end of the extension shaft restricts the slabs from returning back to their respective original horizontal positions. In doing so, the inserts are pulling the disk hub tightly against the top surface of the hub-clamp housing. This holding force on the disk hub must be sufficient to hold a spinning disk hub fully loaded with disks in position and without slip.

The contacting surfaces of the inserts 222 are specially hardened or treated to resist wear. The inserts can also be readily replaced if damages were to occur. The bottom surface of the flange of the disk hub will be in close contact with the top surface of the hub clamp surface. These two surfaces must be machined with similar flatness tolerance and are required to be perpendicular to the air spindle shaft axis of rotation. The base of the hub clamp housing 102 is tightly bolted to the air bearing spindle shaft such that the shaft axes of the disk hub, the hub clamp assembly and the air bearing spindle are all aligned along the same line.

The catch plate holds the disk hub tightly to the top of the hub clamp housing by exerting both axial and radial forces. As symmetrical forces are applied all round the ball-shaped end, the clamping mechanism is self-centering. The clamping action can be in force without any electrical or pneumatic means.

In one embodiment, there is provided a quick release mechanism for the hub clamp that can be designed to push and bend the slabs of the catch plate upwards and disengage the specially shaped inserts from the ball-shaped end of the disk hub extension shaft. As shown in FIG. 2, a set of pushpins 213 are lined in circles and mounted on a plate 214 placed under the clamping slabs. Using compress air or other form of motorized mechanism, the pushpins can be raised upwards, pushing the slabs along. Upon raising the pushpins sufficiently, the inserts on the slabs will open out until the central opening on the catch plate is larger than the diameter of the ball-shaped end on the extension shaft of the disk hub. The disk hub can then be taken off from the top of the hub clamp housing.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A hub/clamp assembly for holding a disk hub in position when the hub is spin in a high speed, comprising of:
   a removable disk hub having a shaft for stacking a plurality of storage disks, a flange portion integrally attached to one end of the shaft, and an extension shaft integrally attached to the flange portion opposite to the shaft; wherein the axes of the shaft, the flange portion, and the extension shaft are in alignment; and
   a hub clamp housing having a housing with side walls and top and bottom surfaces, and a clamp means disposed within the cavity formed within the housing;
   wherein the top surface of the housing has a central opening through which the extension shaft of the removable disk hub can pass through;
   wherein the extension shaft of the removable disk hub is so configured that it has a smooth protrusion with a largest diameter snugly fitting the central opening on the top surface of the hub clamp housing, thereby ensuring the removable disk hub being centered on the hub clamp housing; and a ball-shaped end allowing the clamping means to engage thereon and hold the removable disk hub tightly on the top surface of the hub clamp housing; and
   wherein the clamp means comprises a catch plate with a plurality of circumferentially spaced slabs extending from the side walls of the housing towards the center of the hub clamp housing, and a plurality of specially shaped inserts integrally disposed onto the smaller end of each of the plurality of circumferentially spaced slabs; thereby, when the inserts engage the ball-shaped end of the extension shaft, the slabs press the ball-shaped end downwards and towards the center of the shaft axis; and when the slabs are bended, the inserts will disengage the ball-shaped end, releasing the removable disk hub from the clamping means so that the removable disk hub can be removed from the hub clamp housing.

2. The hub/clamp assembly of claim 1, wherein each of the plurality of storage disks has a central opening; and wherein the shaft has a cylindrical shape and is so configured that it has a uniform diameter slightly smaller than the diameter of the central opening of the storage disks; thereby the storage disks can be stacked onto the shaft tightly without additional means.

3. The hub/clamp assembly of claim 1, wherein the flange portion has a circular shape with a first and a second planar surfaces that are flat and accurately machined; and wherein the first planar surface provides contact with one storage disk, and the second planar surface provides fit contact with the top surface of the hub clamp housing.

4. The hub/clamp assembly of claim 1, wherein the clamp means further comprises a quick release mechanism that will push and bend the slabs of the catch plate upwards and disengage the inserts from the ball-shaped end of the extension shaft.

5. The hub/clamp assembly of claim 4, wherein the quick release mechanism comprises a plurality of pushpins lined in circles mounted on a plate placed under the slabs; thereby, when the plurality of pushpins are pushed upwards, the slabs will be pushed upwards, resulting disengagement of the inserts with the ball-shaped end.

6. The hub/clamp assembly of claim 5, wherein the plurality of pushpins are pushed against the slabs by compressed air.

7. A multi-disk servowriter for writing servo information onto multiple storage disks at the same time, comprising:
   a base with an air spindle shaft providing the spinning power for the servowriter;
   a removable disk hub having a shaft for stacking a plurality of storage disks, a flange portion integrally attached to one end of the shaft, and an extension shaft integrally attached to the flange portion opposite to the shaft; wherein the axes of the shaft, the flange portion, and the extension shaft are in alignment; and
   a hub clamp housing having a housing with side walls and top and bottom surfaces, and a clamp means disposed within the cavity formed within the housing;
   wherein the top surface of the housing has a central opening through which the extension shaft of the removable disk hub can pass through;
   wherein the extension shaft is so configured that it has a smooth protrusion with a largest diameter snugly fitting the central opening on the top surface of the hub clamp housing, thereby ensuring the removable disk hub being centered on the hub clamp housing; and a ball-shaped end allowing the clamping means to engage thereon and hold the removable disk hub tightly on the top surface of the hub clamp housing;
   wherein the clamp means comprises a catch plate with a plurality of circumferentially spaced slabs extending from the side walls of the housing towards the center of the hub clamp housing, and a plurality of specially shaped inserts integrally disposed onto the smaller end of each of the plurality of circumferentially spaced slabs; thereby, when the inserts engage the ball-shaped end of the extension shaft, the slabs press the ball-shaped end downwards and towards the center of the shaft axis; and when the slabs are bended, the inserts will disengage the ball-shaped end, releasing the removable disk hub from the clamping means so that the removable disk hub can be removed from the hub clamp housing; and
   and wherein the hub clamp housing is rigidly mounted onto the air spindle shaft so that the removable disk hub and the hub clamp housing spins with the air spindle shaft.

8. The multi-disk servowriter of claim 7, wherein each of the plurality of storage disks has a central opening; and wherein the shaft has a cylindrical shape and is so configured that it has a uniform diameter slightly smaller than the diameter of the central opening of the storage disks; thereby the storage disks can be stacked onto the shaft tightly without additional means.

9. The multi-disk servowriter of claim 7, wherein the flange portion has a circular shape with a first and a second planar surfaces that are flat and accurately machined; and wherein the first planar surface provides contact with one storage disk, and the second planar surface provides fit contact with the top surface of the hub clamp housing.

10. The multi-disk servowriter of claim 7, wherein the clamp means further comprises a quick release mechanism that will push and bend the slabs of the catch plate upwards and disengage the inserts from the ball-shaped end of the extension shaft.

11. The multi-disk servowriter of claim 10, wherein the quick release mechanism comprises a plurality of pushpins lined in circles mounted on a plate placed under the slabs; thereby, when the plurality of pushpins are pushed upwards, the slabs will be pushed upwards, resulting disengagement of the inserts with the ball-shaped end.

12. The multi-disk servowriter of claim 11, wherein the plurality of pushpins are pushed against the slabs by compressed air.

* * * * *